US012458227B2

(12) United States Patent
Charles

(10) Patent No.: US 12,458,227 B2
(45) Date of Patent: Nov. 4, 2025

(54) OPHTHALMIC VISUALIZATION USING CONFOCAL MEMS SCANNING

(71) Applicant: Alcon Inc., Fribourg (CH)

(72) Inventor: Steven T. Charles, Memphis, TN (US)

(73) Assignee: Alcon, Inc., Fribourg (CH)

( * ) Notice: Subject to any disclaimer, the term of this patent is extended or adjusted under 35 U.S.C. 154(b) by 327 days.

(21) Appl. No.: 18/462,767

(22) Filed: Sep. 7, 2023

(65) Prior Publication Data
US 2024/0138675 A1 May 2, 2024

Related U.S. Application Data

(60) Provisional application No. 63/506,704, filed on Jun. 7, 2023, provisional application No. 63/488,071, filed on Mar. 2, 2023, provisional application No. 63/420,113, filed on Oct. 28, 2022.

(51) Int. Cl.
*A61B 3/15* (2006.01)

(52) U.S. Cl.
CPC ...................... *A61B 3/15* (2013.01)

(58) Field of Classification Search
CPC ........................................................ A61B 3/15
USPC ............................................................ 351/206
See application file for complete search history.

(56) References Cited

U.S. PATENT DOCUMENTS

| 2006/0176448 | A1* | 8/2006 | Van de Velde | ........ | A61B 3/102 |
| | | | | | 351/221 |
| 2008/0231808 | A1* | 9/2008 | Van de Velde | ...... | A61B 3/1025 |
| | | | | | 351/221 |
| 2011/0116040 | A1* | 5/2011 | Biernat | .................. | A61F 9/008 |
| | | | | | 351/215 |
| 2012/0257166 | A1* | 10/2012 | Francis | .............. | G02B 21/0028 |
| | | | | | 351/208 |
| 2013/0194548 | A1* | 8/2013 | Francis | .................... | A61B 3/15 |
| | | | | | 351/208 |

FOREIGN PATENT DOCUMENTS

WO 2011028595 A2 3/2011

OTHER PUBLICATIONS

International Search Report (ISR) dated Oct. 13, 2023; Written Opinion of the International Searching Authority; European Patent Office; Re: International application No. PCT/IB2023/058864'.

* cited by examiner

*Primary Examiner* — Sharrief I Broome
(74) *Attorney, Agent, or Firm* — Quinn IP Law

(57) ABSTRACT

A visualization system for dynamically visualizing an eye includes a laser module operable for outputting a primary laser beam along a beam axis, a beam splitter positioned in the beam axis and configured to direct a first beam portion along the beam axis and a second beam portion along a detection axis that is orthogonal to the beam axis. A microelectromechanical system (MEMS) scanner is arranged on the beam axis and configured, in response to the first beam portion, to output a scanning laser along a visualization path. An avalanche photodiode (APD) detector receives the second beam portion. A 4F correlator optical system has a spatial filter arranged along the visualization path. An optional optical flat may be disposed between the eye and the 4F correlator optical system to achieve stereo parallax.

20 Claims, 5 Drawing Sheets

OPHTHALMIC VISUALIZATION USING CONFOCAL MEMS SCANNING

CROSS-REFERENCE TO RELATED APPLICATIONS

The present application claims the benefit of priority to U.S. Provisional Application No. 63/420,113 filed Oct. 28, 2022, U.S. Provisional Application No. 63/488,071 filed Mar. 2, 2023, and U.S. Provisional Application No. 63/506,704 filed Jun. 7, 2023, which are hereby incorporated by reference in their respective entireties.

INTRODUCTION

The present disclosure relates to visualization systems and associated methods for assisting a physician in visualizing the inner anatomy of a patient's eye. As appreciated in the art, various in-office ophthalmic procedures require an attending physician to illuminate and view the retina, macula, and surrounding areas within the eye's vitreous cavity. The term "visualization" as used herein and in the art thus refers to the dynamic and interactive examination of the eye by the physician. The visualized anatomy is generally not subject to image capture and analysis during the examination, but rather is interpreted by the physician in real-time.

In-office visualization tasks of the types contemplated herein are often assisted by analog slit lamp biomicroscopes or indirect ophthalmoscopes. Analog slit lamp biomicroscopes are typically used for high magnification and small field-of-view viewing of the macula/optic nerve and peripheral retina area, as well as for viewing media opacities. Binocular indirect ophthalmoscopes are often used to perform peripheral retinal examinations, for instance when evaluating retinal holes, tears, or detachments. Other representative examinations may be performed when evaluating conditions such as retina traction, retinoschisis, lattice degeneration, vascularization, hemorrhage, condensations or "floaters", dislocated natural or intraocular lenses, and intraocular foreign bodies.

Some of the myriad of challenges associated with the use of analog slit lamp biomicroscopes and indirect ophthalmoscopes include reflections or glare from the patient's cornea and lens, as well as scattered light/glare from corneal edema, scars, epithelial defects, previous refractive surgery, and other possible sources or causes. Physicians are also challenged by scattered light or glare from cataracts, posterior capsule opacification, and intraocular lenses, especially multifocal and diffractive extended depth-of-focus (EDOF) and implantable collamer lenses (ICLs). Other ocular conditions such as vitreous condensations, hemorrhage, inflammatory cells, protein deposits or concentrations, and asteroid hyalosis can also impact the accurate visualization of a patient's ocular anatomy.

SUMMARY

Disclosed herein are automated visualization systems and associated methods for assisting a physician in performing a photonic vitreoretinal visualization process. The present technical solutions, which rely on a narrow bandwidth light source and micro-electromechanical systems (MEMS)-based confocal spot scanning, help reduce the various above-noted problems typically associated with scattered light. The disclosed visualization system also increases the signal-to-noise ratio (SNR) by about 15 decibels (dB) or more relative to existing in-office visualization systems of the types summarized above. Likewise, the present solutions eliminate problematic reflections, e.g., from the cornea and lens, thereby improving overall results of in-office visualization while providing a clearer and more accurate view of the eye's anatomy.

In a possible embodiment, the visualization system includes a laser module, a beam splitter, a MEMS scanner, an avalanche photodiode (APD) detector, and a 4F correlator optical system having a spatial filter arranged along the visualization path. The laser module outputs a primary laser beam along a beam axis. The beam splitter is positioned in the beam axis and configured to direct (i) a first beam portion of the primary laser beam along the beam axis, and (ii) a second beam portion of the primary laser beam along a detection axis, with the detection axis being orthogonal to the beam axis. The MEMS scanner for its part is arranged on the beam axis and configured, in response to the first beam portion of the primary laser beam, to output a scanning laser toward the eye along a visualization path. In this embodiment, the APD detector receives the second beam portion of the primary laser beam.

In one or more embodiments, an optical flat is disposed between the eye and 4F correlator optical system. The optical flat has a vertical axis about which the optical flat is configured to oscillate at a calibrated frequency to achieve stereo parallax. This occurs when a physician visualizes the eye in real-time using the visualization system.

Other embodiments forego use of the aforementioned optical flat, such that the visualization system is characterized by an absence of the optical flat. Instead, the laser module includes a pair of laser modules, the beam splitter includes a pair of beam splitters, the MEMS scanner includes a pair of MEMS scanners, and the APD detector includes a pair of APD detectors. In this alternative implementation, the visualization system includes a respective one of the laser modules, beam splitters, MEMS scanners, and APD detectors in each of two different viewing channels.

Another embodiment of the visualization system includes a laser module, a beam splitter, a MEMS scanner, an APD detector, a 4F correlator optical system, an APD detector, digital oculars, an optical flat, and an electronic control unit (ECU). The laser module in this embodiment is operable for outputting a primary laser beam along a beam axis, the laser module including a red, green, and blue (RGB) light emitting diode (LED) array and an infrared (IR) laser diode, and wherein the laser module is selectively switchable between the RGB LED array and the IR laser diode. The beam splitter is positioned in the beam axis, the beam splitter being configured to direct (i) a first beam portion of the primary laser beam along the beam axis, and (ii) a second beam portion of the primary laser beam along a detection axis, which in turn is arranged orthogonal to the beam axis.

The MEMS scanner in this implementation is arranged on the beam axis and configured, in response to the first beam portion of the primary laser beam, to output a scanning laser toward the eye along a visualization path. The APD detector is configured to receive the second beam portion of the primary laser beam. The 4F correlator optical system has a Fourier plane and a spatial filter arranged along the visualization path, the spatial filter including at least one pinhole located in the Fourier plane. The optical flat is disposed between the eye and 4F correlator optical system, and has a vertical axis about which the optical flat is configured to oscillate at a calibrated frequency to thereby achieve stereo parallax. This occurs when a physician visualizes the eye using the visualization system. The ECU is operable for performing a confocal spot scan of the eye using the laser module, the MEMS scanner, the 4F correlator optical system, and the APD detector.

Another aspect of the disclosure includes a method for dynamically visualizing an eye includes outputting a primary laser beam along a beam axis using a laser module, including outputting an RGB laser beam and an IR laser beam. The method also includes directing, via a beam splitter, (i) a first beam portion of the primary laser beam along the beam axis, and (ii) a second beam portion of the primary laser beam along a detection axis. In response to the first beam portion of the primary laser beam, the method further includes outputting a scanning laser toward the eye along a visualization path via a MEMS scanner, and detecting the second beam portion of the primary laser beam via an APD detector.

Additionally, the method includes directing the second beam portion of the primary laser beam along the detection axis and through a 4F correlator optical system having a spatial filter arranged in the visualization path. A confocal spot scan of the eye is performed via an ECU using the laser module, the MEMS scanner, the 4F correlator optical system, and the APD detector.

The above-described features and advantages and other possible features and advantages of the present disclosure will be apparent from the following detailed description of the best modes for carrying out the disclosure when taken in connection with the accompanying drawings.

Figure 1:
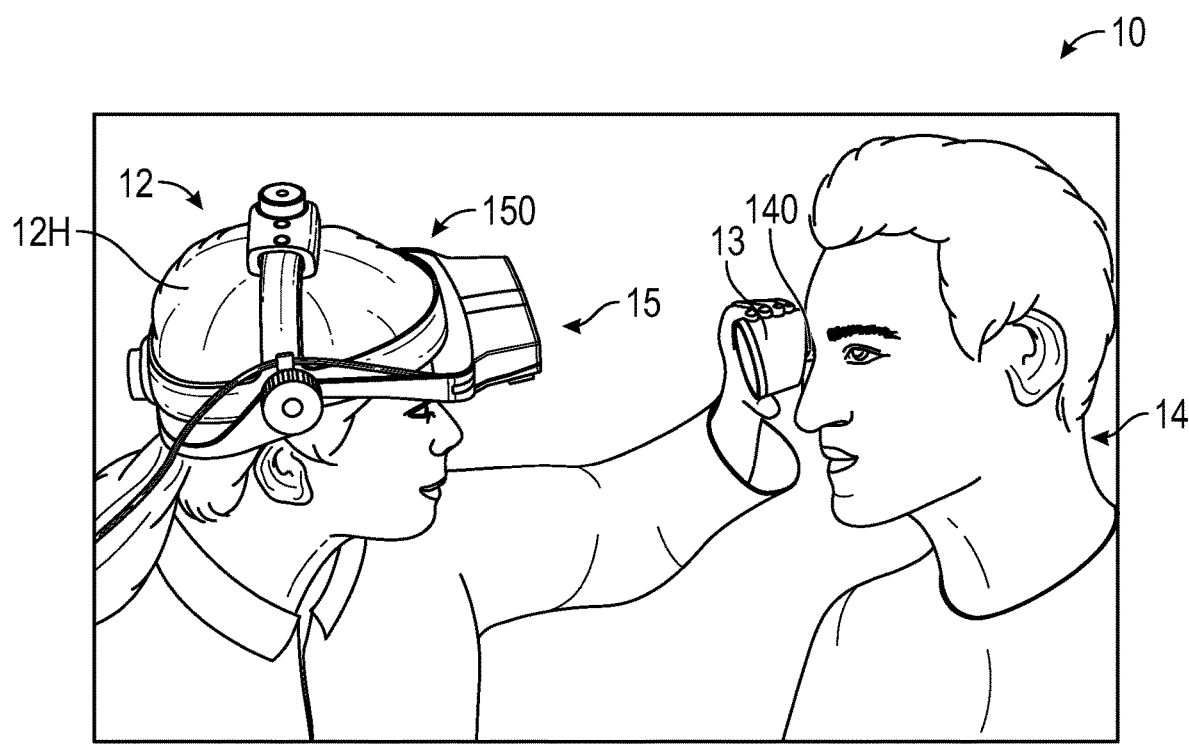
FIG. 1 is a schematic illustration of an exemplary in-office visualization process that is dynamically performed using a visualization system configured as set forth in detail herein.

The foregoing and other features of the present disclosure are more fully apparent from the following description and appended claims, taken in conjunction with the accompanying drawings.

DETAILED DESCRIPTION

Embodiments of the present disclosure are described herein. It is to be understood, however, that the disclosed embodiments are merely examples and other embodiments can take various and alternative forms. The Figures are not necessarily to scale. Some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "fore," "aft," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

As appreciated by those skilled in the art, vitreoretinal examination is a dynamic process performed with multiple degrees of freedom. During a typical visualization process, an attending physician constructs a three-dimensional "mental model" of the patient's inner ocular anatomy. Accurate visualization is highly dependent on a constantly varying vantage point and focal plane. For the above-summarized slit lamp, for instance, the physician is often required to manipulate a joystick with a rotating handle to bring target ocular anatomy into and out of focus. The indirect ophthalmoscope for its part is highly dependent on the physician's head/neck position and orientation, the patient's ocular rotation and head position, and positioning and angulation of a condensing lens.

Vitreoretinal examination is a volumetric task as opposed to being a planar task. This in turn makes stereo/binocular viewing of the ocular anatomy an essential practice. During the examination, the physician's visual cortex calculates depth-of-field by matching corresponding points from each eye located within a volitionally selected depth subset of paired volumes, i.e., the visual horopter or Panum's fusional area. Near-field and far-field visual noise/scatter/clutter is attenuated outside of the visual horopter. A pair of volumes located in front of and behind the visual horopter are double, but are not seen as such by the physician. Therefore, a need remains in the art for improved spatial awareness, even when the viewed anatomy is not in proper focus. The present solutions are intended to provide such improved spatial awareness and other attendant benefits as set forth in detail below.

Referring to the drawings, wherein like reference numbers refer to like components, an in-office examination 10 is illustrated in FIG. 1 during which an ophthalmologist or another attending physician 12 visualizes an eye 140 of a patient 14. This action occurs dynamically, i.e., in real-time, with the assistance of an automated visualization system 15. Embodiments of the visualization system 15 are described in detail below with reference to FIGS. 2 and 3, with an associated method 50 shown in FIG. 4. Attendant benefits of enhanced visualization capabilities of the physician 12 occurs herein using confocal, microelectromechanical sensor (MEMS)-based spot scanning of the eye 140. The physician 12 could be assisted during this effort by an handheld lens 13 in some implementations, as appreciated in the art and as additionally shown in FIG. 3.

Although shown schematically in FIG. 1 for simplicity and clarity, the automated visualization system 15 of the present disclosure can be implemented in different form factors, including a separate standalone device (not shown)

in the manner of the above-summarized slit lamp (not shown), or as a headset 150 worn by or secured about a head 12H of the physician 12. The resulting compact and lightweight packaging of the constituent components of the automated visualization system 15 thus facilitates various implementations within the scope of the disclosure.

Figure 2:
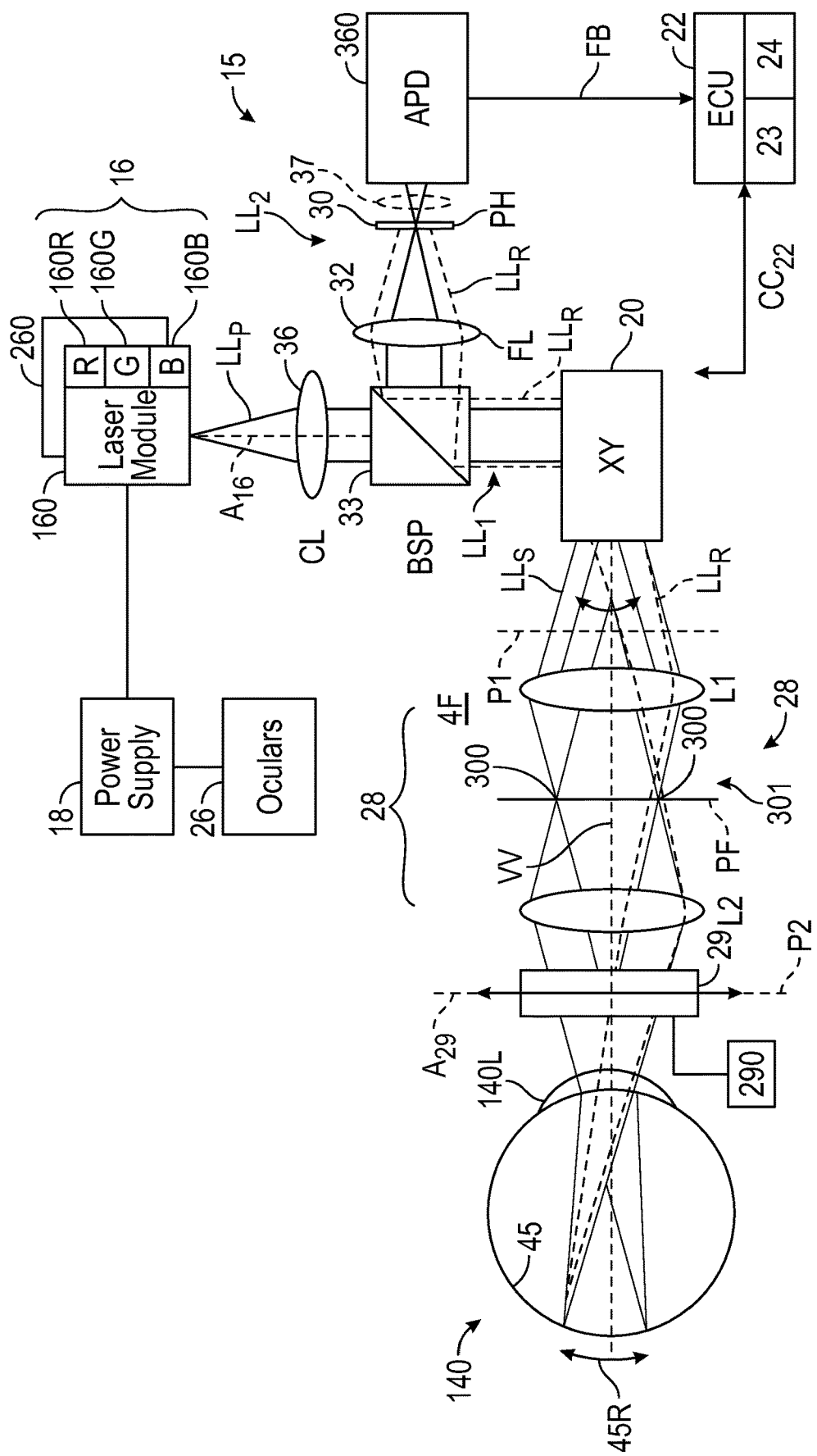
FIG. 2 is a schematic illustration of a representative embodiment of the visualization system depicted in FIG. 1.

Referring to FIG. 2, the automated visualization system 15 in accordance with a possible embodiment includes one or more laser modules 16, a power supply 18, e.g., a rechargeable battery or a belt-worn battery pack, digital oculars 26, and a dual-axis MEMS scanner 20, i.e., having two scanning axes nominally indicated by the label "XY". The automated visualization system 15 may also include an electronic control unit (ECU) 22 configured to control motion, position, state, or other parameters of the various components of the automated visualization system 15 during the ongoing performance of the in-office examination 10 depicted in FIG. 1.

The MEMS scanner 20 as contemplated herein could be optionally embodied as a dual-axis piezoelectric scanning device having a resonant horizontal axis ("fast axis") and a quasi-static vertical axis ("slow axis"). For example, the MEMS scanner 20 could have individually-controllable turning mirrors or prisms to provide a mechanically-variable parallax angle for the physician 12 of FIG. 1. In other possible configurations, the MEMS scanner 20 could be implemented as electromagnetic or electrostatic devices. Using electronic control signals ($CC_{22}$), the ECU 22 is operable for communicating with the various components of the automated visualization system 15 as noted above when performing a confocal spot scan of the eye 140.

With respect to the laser module 16 of FIG. 2, this light-emitting component may include three or more laser diodes (LD) collectively forming a color LED array 160. The laser module 16 may additionally include an infrared (IR) laser diode 260 in a possible configuration. A primary laser beam ($LL_P$) is emitted by the laser module 16 and directed along a beam path ($A_{16}$) toward a beam splitter (BSP) 33, possibly via a condensing lens (CL) 36 likewise arranged in the beam path ($A_{16}$).

The beam splitter 33 located in this position divides the primary laser beam ($LL_P$) into respective first and second beam portions ($LL_1$ and $LL_2$). The beam splitter 33 may be arranged adjacent to a focusing lens (FL) 32 that is configured to direct the second beam portion ($LL_2$) through a pinhole (PH) 30 and onto an avalanche photodiode (APD) detector 360 as part of the contemplated construction. The APD detector 360 for its part is in communication with the ECU 22, either wirelessly or via physical transfer conductors, and thus provides a sensory feedback signal (FB) to the ECU 22 as part of the ongoing visualization process. Reflected light ($LL_R$) from the eye 140 is also directed to the APD detector 360 as part of the detection process for ultimate viewing by the physician 12 of FIG. 1, i.e., via the digital oculars 26.

The beam splitter 33 of FIG. 2 is thus positioned and equipped to direct the first beam portion ($LL_1$) from the laser module 16 into the MEMS scanner 20. The MEMS scanner 20 thereafter oscillates and directs the first beam portion ($LL_1$) as a scanning laser ($LL_S$) into a 4F correlator optical system 28 as described below. The ECU 22 is thus configured to control a confocal spot scanning process of the eye 140 during by controlling the output of the scanning laser ($LL_S$) and the associated components of the depicted automated visualization system 15.

In a possible construction, the LED array 160 show in FIG. 2 may include a stereo direct-view device constructed from a red (R) laser diode 160R, a green (G) laser diode 160G, and a blue (B) laser diode 160B for generation of white light. Commercially-available, highly compact RGB laser modules may be used for this purpose, e.g., the Veglas™ RGB laser module from ams OSRAM AG. Commercially-available options for the MEMS scanner 20 include, by way of an example, a MEMS-based laser scanning module from Microvision, Inc., of Redwood, WA. Such RGB laser diode-based embodiments of the MEMS scanner 20 as contemplated herein are highly compact with a superior dynamic range.

In an optional embodiment, the laser module 16 of FIG. 2 is selectively switchable between the constituent color laser diodes 160R, 160G, and 160B and the IR laser diode 260. The LED array 160 could be implemented as a Fabry-Perot laser diode setup with a relatively narrow bandwidth spectrum, with control degrees of freedom in terms of gain and feedback within a laser cavity. As will be appreciated by those skilled in the art, unlike visible light, near IR (NIR) light does not require a darkened room or pupillary dilation, e.g., via dilation drops. For children and other patients with photophobia, the NIR spectrum may be a useful alternative or a complementary light source for direct viewing during examination. NIR implementation alone could be used in other embodiments. Such an approach may be simpler in terms of required optics, and would eliminate the need for multiple mirrors/beam splitters, but at the expense of additional electronic sensing and display capabilities, as appreciated in the art.

The present "RGB+IR" solutions could be used to replace indirect or slit lamp light sources with the IR laser diode 260 (about 820 nm) and the color LED array, i.e., white light, in a switchable configuration. That is, the physician 12 could turn the IR laser diode 260 on and off when needed, with the APD detector 360 being sensitive enough to detect such light. However, as IR direct-view confocal visualization is not possible, IR-based implementations contemplated herein require the 4F correlator optical system 28 for true confocal capability, along with the laser module 16 and the digital oculars 26, or variations thereof. Images from IR illumination in some implementations could be displayed as green (about 550 nm) on a black background.

The APD detector 360 shown schematically in FIG. 2 is used herein with the laser module 16 to provide spot scanning and confocal imaging capabilities within the scope of the disclosure, while largely eliminating scattered light. As appreciated by those of ordinary skill in the art, APDs are a particular type of photodiode in which high internal gain is produced by applying a reverse voltage. The resulting high gain, sensitivity, and fast response times of the APD detector 360 thus increase SNR relative to other types of photodetectors, and lends itself to the switchable color-IR technique described herein. Exemplary commercially-available APD detectors 360 usable herein include those offered by Hamamatsu Photonics K.K. of Hamamatsu City, Japan, or Excelitas Technologies® Corporation of Waltham, Massachusetts, USA.

Still referring to FIG. 1, the automated visualization system 15 in other possible implementations may replace analog viewing using conventional oculars, instead using the digital oculars 26 and the APD detector 360, along with the 4F correlator optical system 28. Real-time in-office visualization by the physician 12 of FIG. 1, in a non-limiting embodiment in which the physician 12 wears the headset 150 fastened about the head 12H, may be enhanced using an ultracompact stereo OLED display, e.g., a 2K AMOLED pair from eMagin Corporation of Hopewell Junction, New York, USA, or a comparable application-suitable OLED pair from Seeya Information Technology of Shanghai, China. The laser module 16 and the digital oculars 26 could be packaged together on a wearable device, e.g., with the digital oculars 26 being situated between the eyes of the physician 12 within or otherwise mounted to the headset 150.

Still referring to FIG. 2, the 4F correlator optical system 28 as contemplated herein and understood in the general art of optical physics forms an optical relay using two optical lenses L1 and L2. The lenses L1 and L2 are arranged in a visualization path (VV) extending between the MEMS scanner 20 and the eye 140. An input plane P1 is located one focal length apart from/in front of the first lens L1. An output plane P2 is located one focal length after the second lens L2, i.e., closer to the eye 140 than the first lens L1. A Fourier plane (PF) is located midway between the respective input and output planes P1 and P2. The abbreviation "4F" thus refers to the four corresponding single focal length distances of separation between the input plane P1 and the first lens L1, the first lens L1 and the Fourier plane (PF), the Fourier plane (FP) and the second lens L2, and the second lens L2 and the output plane P2. One or more pinholes 300 may be used as part of the 4F correlator optical system 28 to form a spatial filter 301 in the Fourier plane (PF), with the spatial filter 301 being configured to reject scattered light within the automated visualization system 15.

As appreciated by those skilled in the art, time-sequential RGB images are integrated by the human brain within the brain's visual cortex, provided the frame rate for each perceived color exceeds a critical flicker fusion rate of about 60 Hz per color, or about 180 Hz in the aggregate for RGB applications. Confocal spot scanning as contemplated herein, and as enabled by the 4F correlator optical system 28 and the APD detector 360, can improve the SNR by about 15 dB largely as noted above, which occurs by reducing scattered light. However, confocal spot scanning also significantly decreases the depth-of-field perceived by the physician 12 of FIG. 1.

As part of the illustrated configuration, therefore, an optional liquid lens 37 may be situated between the pinhole 30 and the APD detector 360. The ECU 22 in such an embodiment could drive the liquid lens 37 with a sine wave as part of the control signals ($CC_{22}$) to increase the depth-of-field of the physician 12 in stereo, RGB laser diode spot, or slit scanning embodiments of the automated visualization system 15, with limited degrees of freedom. A sine wave-driven implementation could help reduce speckle in a direct-view, stereo RGB laser diode spot or slit scanning embodiment of the visualization system 15. The liquid lens 37, e.g., from Optotune Switzerland, AG, can therefore provide the desirable depth-of-field, and can be selectively driven through a large amplitude focus range, typically in about 1-2 milliseconds (ms).

Additionally, an optional circular polarizer 51 (see FIGS. 3A and 3B) could be situated in the visualization path (VV) for improved visualization. For instance, use of the circular polarizer 51 could help increase contrast and reduce glare and reflections. The circular polarizer 51 also prevents crosstalk between left/right channels in the FIG. 3B embodiment. The optional circular polarizer 51 in such a dual-channel implementation could be used in both channels to help eliminate cross-talk between the channels.

Although the ECU 22 is depicted schematically in FIG. 2 as a unitary box for illustrative clarity and simplicity, the ECU 22 could include one or more networked devices each with a central processing unit or other processor 23 and sufficient amounts of memory 24, including a non-transitory (e.g., tangible) medium that participates in providing data/instructions that may be read by the processor 23. The memory 24 may take many forms, including but not limited to non-volatile media and volatile media. As will be appreciated, non-volatile media may include optical and/or magnetic disks or other persistent memory, while volatile media may include dynamic random-access memory (DRAM), static RAM (SRAM), etc., any or all which may constitute a main memory of the ECU 22. Input/output circuitry may be used to facilitate connection to and communication with the various peripheral devices used during the ophthalmic procedure. Other hardware not depicted but commonly used in the art may be included as part of the ECU 22, including but not limited to a local oscillator or high-speed clock, signal buffers, filters, etc. Connectivity may be provided via BLUETOOTH, Wi-Fi, HDMI, NFC, DISPLAY PORT, THUNDERBOLT, etc.

Still referring to the visualization system 15 of FIG. 2, an optical flat 29 having a vertical axis ($A_{29}$) may be used in one or more embodiments. As described below, alternative embodiments such as that which is depicted in FIG. 3B may be implemented that forego use of the optical flat 29. The optional optical flat 29 of FIGS. 2 and 3A would be useful in embodiments in which the laser module 16, pinhole 300, and APD detector 360 are shared components, i.e., a single-channel implementation.

The optical flat 29 is configured to oscillate around its vertical axis ($A_{29}$) when driven by an actuator 290, e.g., a resonant moving magnet galvo, a piezoelectric stack (piezo-actuator), or another application-suitable oscillatory actuation device. The optical flat 29 in one or more embodiments is configured as a polished flat reference surface, such as fused silica or another application-suitable material. In the contemplated construction of the visualization system 15, for instance, the optical flat 29 is configured to oscillate on the vertical axis ($A_{29}$) in a scan/de-scan path of the MEMS scanner 20 so as to achieve stereo parallax. That is, a parallax shift of a type required for proper stereo viewing by the physician 12 of FIG. 1 is provided by operation of the optical flat 29 as the optical flat 29 oscillates around its vertical axis ($A_{29}$). To this end, the actuator 290 when attached to the optical flat 29 is configured to oscillate the optical flat 29 at a calibrated frequency, which as used herein should be greater than an aggregate frame rate of about 60 Hz per color or 180 Hz for the illustrated RGB embodiment of FIG. 2. Thus, the scanning laser ($LL_S$) passes through the optical flat 29 and enters the eye 140 through a lens 140L thereof, and thereafter illuminates the posterior wall 45 of the eye 140 within a controlled scanning range 45R.

Figure 3A:
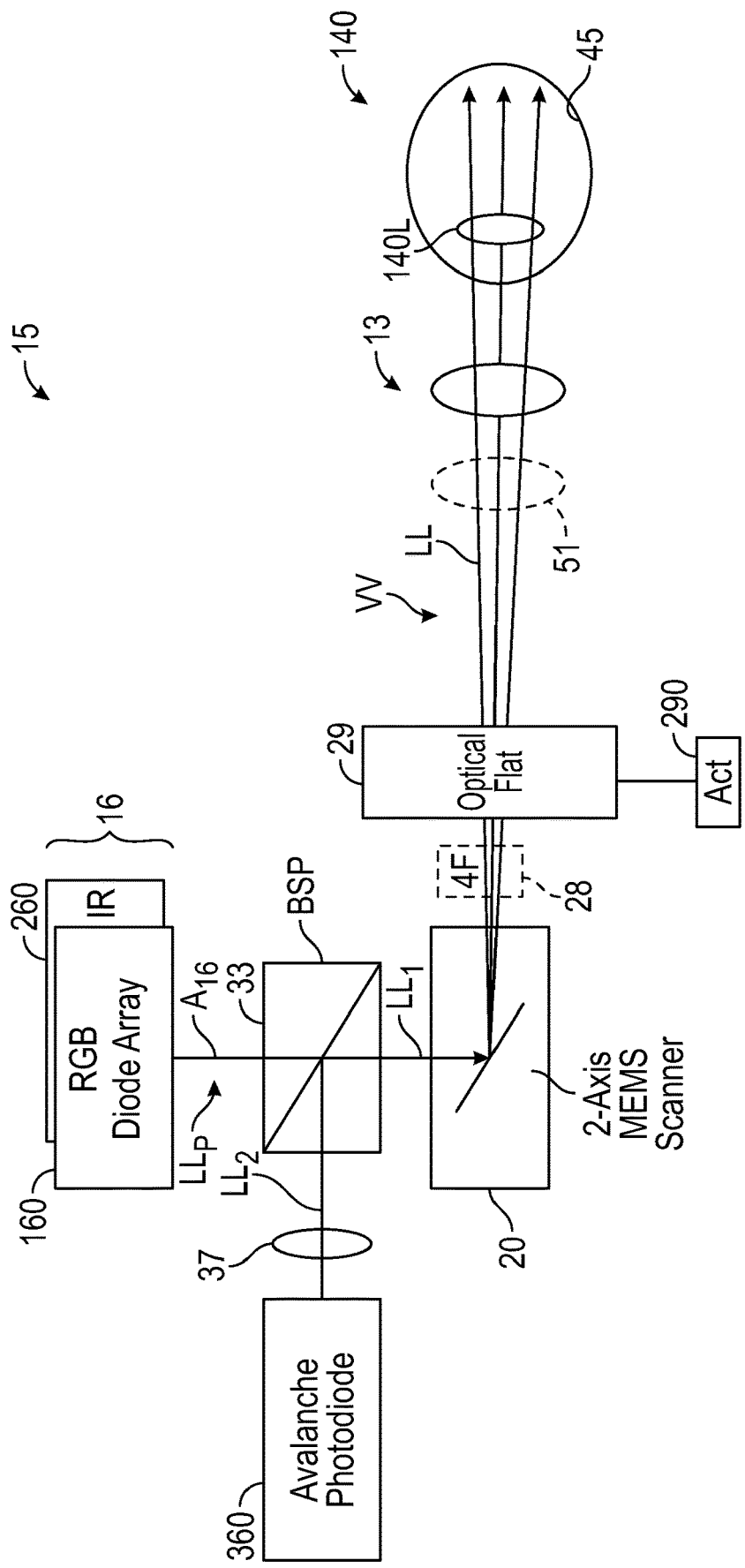
FIGS. 3A and 3B are illustrations of embodiments of the visualization system of FIGS. 1 and 2 in the process of performing a confocal spot scan of a patient's eye.
Figure 3B:
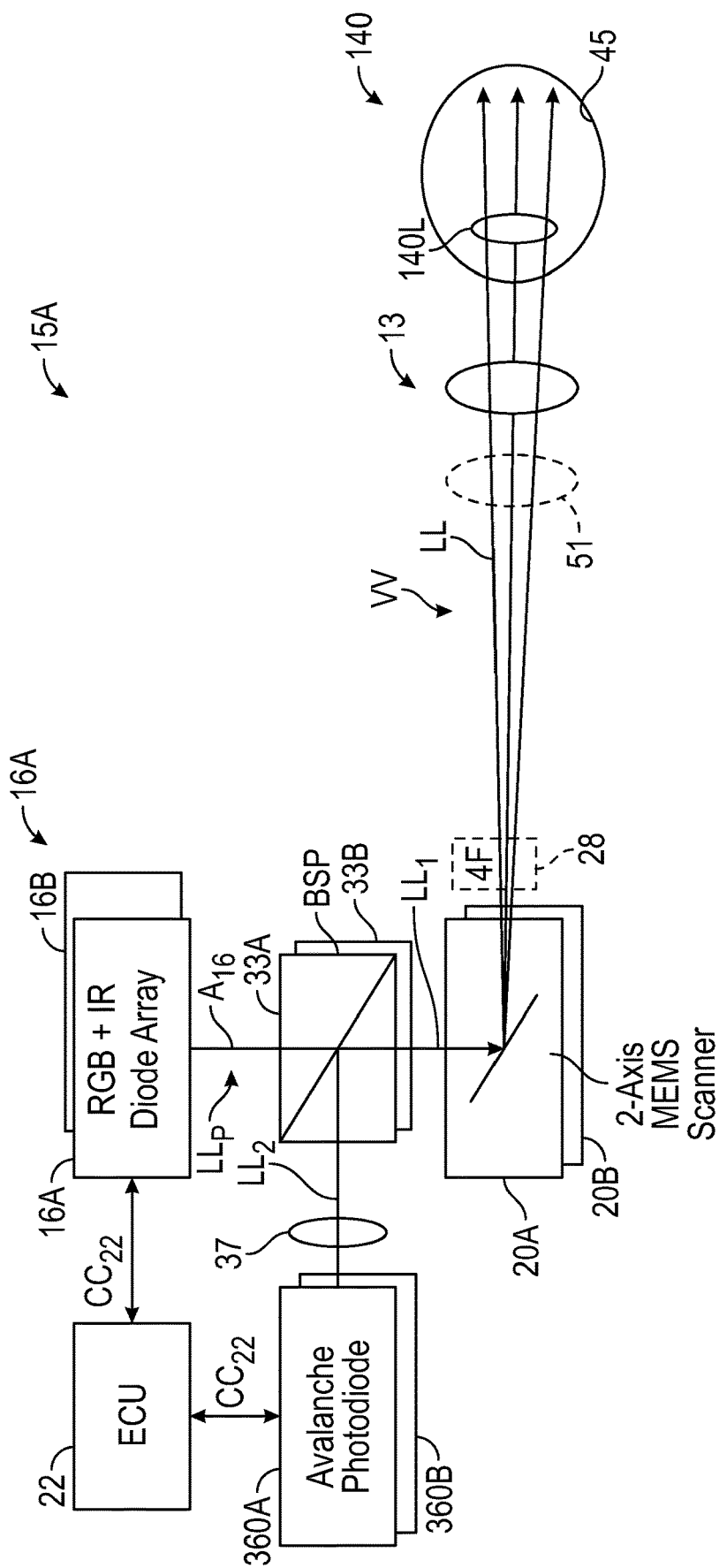

Referring briefly to FIG. 3A, a representative embodiment of the automated visualization system 15 uses a single-channel architecture in which the APD detector 360, MEMS scanner 20, pinhole 30, laser module 16, and beam splitter 33 are single devices/shared. Although omitted for clarity, a galvo-controlled minor apparatus may be controlled downstream of the beam splitter (BSP) 33 to provide the physician 12 with right and left channel viewing capabilities. In this setup, the automated visualization system 15 of FIG. 3A arranges the above-described laser module 16 proximate the beam splitter 33. The beam splitter 33 in this particular embodiment directs the primary laser beam ($LL_P$) toward the MEMS scanner 20. In this construction, the MEMS scanner 20 is positioned in the primary beam path ($A_{16}$) directs scanning laser ($LL_S$) toward the eye 140, possibly through the intervening high-diopter handheld lens 13. "High-diopter" as used herein may vary with the particular examination that is being performed. By way of example and not of limitation, the high-diopter handheld lens 13 could be a 78-90 diopter lens or a 20-30 diopter lens. The scanning laser ($LL_S$) then passes through the lens 140L of the eye 140 to illuminate the posterior wall 45 during the in-office examination 10 of FIG. 1.

As an alternative construction to that of FIG. 3A, the automated visualization system 15A of FIG. 3B foregoes use of the optical flat 29 and the (single) laser module 16 shown in FIGS. 2 and 3. Instead, the automated visualization system 15A uses the ECU 22 and electronic control signals ($CC_{22}$) to coordinate right/left channel operation by doubling the number of certain components and using the same in separate viewing channels. Channel switching may be achieved using a suitable commercially-available micromechanical fiber optic switch, e.g., the LightBend™ family of high-performance optical switches from Agiltron®, Inc., of Woburn, MA. As shown, this would include integration of separate pairs of/first and second laser modules 16A and 16B, first and second AVD detectors 360A and 360B, and first and second beam splitters 33A and 33B. Likewise, the architecture of FIG. 3B would require two dual-axis MEMS scanners 20A and 20B.

In the exemplary dual-channel implementation of FIG. 3B, the ECU 22, via the electronic control signals ($CC_{22}$), is configured to synchronize operation of the APD detectors 360A, 360B, the laser modules 16A, 16B, and the MEMS scanners 20A, 20B so that right and left channels rapidly alternate. Such an approach avoids the need for the above-described optical flat 29 and its associated actuator 290. The setup of FIG. 3B may help avoid undesirable cross-talk and the need for complex optics such as mirrors or prisms by arranging separate right/left channels for viewing by the physician 12 of FIG. 1.

Thus, the laser module 16 of FIG. 2 may include the pair of laser modules 16A and 16B, the beam splitter 33 may include the pair of beam splitters 33A and 33B, the MEMS scanner 20 may include the pair of MEMS scanners 20A and 20B, and the APD detector 360 may include the pair of APD detectors 360A and 360B, such that the visualization system 15A of FIG. 3B includes a respective one of the laser modules 16A, 16B, beam splitters 33A, 33B, MEMS scanners 20A, 20B, and APD detectors 360A, 360B in each of two different/right and left viewing channels.

Figure 4:
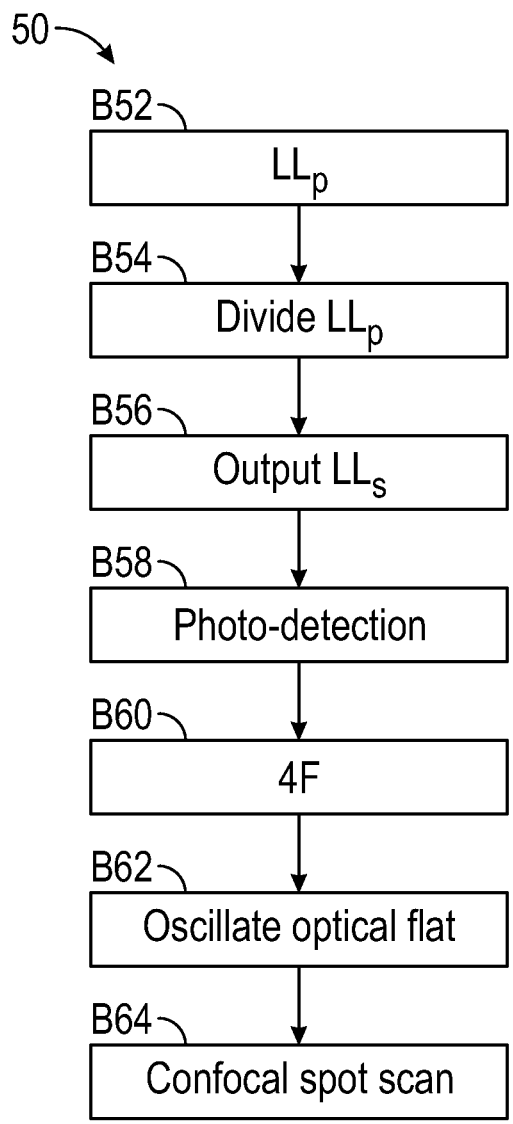
FIG. 4 is a flow chart describing a method for visualizing a patient's eye using the visualization system of FIGS. 1-3B.

Referring to FIG. 4, a method 50 can be performed via the ECU 22 of FIG. 2 and its embodiments of FIGS. 3A and 3B when the physician 12 of FIG. 1 dynamically visualizes the eye 140. For example, computer-readable instructions may be recorded in the memory 24 of FIG. 2 and executed by the processor 23 to cause the ECU 22 or other hardware components of the automated visualization system 15 to perform the noted actions. FIG. 4 is organized into discrete logic blocks for simplicity, with each block describing a corresponding function or functions performed in the course of executing the method 50.

In an exemplary embodiment, the method 50 commences with block B52 ("$LL_P$"), which includes outputting the primary laser beam ($LL_P$) along the beam axis ($A_{16}$) using the laser module 16 of FIGS. 2 and 3A, or via the dual laser modules 16A and 16B of FIG. 3C. This action may commanding the laser module 16 or 16A, 16B to output the primary laser beam as a red, green, blue (RGB) laser beam and/or infrared (IR) laser beam in one or more implementations. The method 50 then proceeds to block B54.

Block B54 ("Divide $LL_P$") includes dividing the primary laser beam ($LL_P$) into its constituent first and second beam portions ($LL_1$, $LL_2$) via the beam splitter 33 of FIGS. 2 and 3A (or the dual beam splitters 33A and 33B of FIG. 3B) and then directing the first beam portion ($LL_1$) along the beam axis ($A_{16}$). The second beam portion ($LL_2$) is in turn is directed toward the APD detector 360 (or dual APD detectors 360A, 360B) along the detection axis ($A_{360}$). The method 50 thereafter proceeds to block B56.

In block B56 ("Output $LL_S$"), in response to the first beam portion ($LL_1$) of the primary laser beam ($LL_P$), the MEMS scanner 20 (or dual MEMS scanners 20A, 20B of FIG. 3B) outputs the scanning laser ($LL_S$) along a scanning axis, i.e., the visualization path (AA). The method 50 then proceeds to block B58.

At block B58 ("Photo-detection"), the APD detector 360 is used for detecting the second beam portion ($LL_2$) of the primary laser beam ($LL_P$). Likewise, embodiments in accordance with the setup of FIG. 3B would use the dual APD detectors 360A, 360B for this purpose. The method 50 then proceeds to block B60 as the APD detector 360, 360A, or 360B outputs the feedback signal (FB) to the ECU 22, the feedback signal (FB) being indicative of the second beam portion ($LL_2$).

Block B60 ("4F") includes directing the second beam portion ($LL_2$) of the primary laser beam ($LL_P$) along the visualization path (AA) and through the 4F correlator optical system 28, the latter having the spatial filter 301 of FIG. 2. The method 50 then proceeds to block B62.

At block B62 ("Oscillate optical flat"), the method 50 in embodiments employing the optical flat 29 of FIGS. 2 and 3A includes oscillating the optical flat 29 about its vertical axis ($A_{29}$). This occurs at a calibrated frequency of at least about 60 Hz per color, or 180 Hz in the aggregate as noted above, and is used to achieve stereo parallax when the physician 12 of FIG. 1 visualizes the eye 140 using the automated visualization system 15 described herein. As disclosed above, the embodiment of FIG. 3B foregoes use of the optical flat 29. Thus, the method 50 using the architecture of FIG. 3B would not perform block B62. The method 50 then proceeds to block B64.

Block B64 ("Confocal spot scan") includes performing a confocal spot scan of the eye 140 of FIGS. 1-3 via the ECU 22 using the laser module 16, 16A, or 16B, the MEMS scanner 20, 20A, or 20B, the 4F correlator optical system 28, the APD detector 360, 360A, or 360B, and in the case of FIGS. 2 and 3A, the optical flat 29. This may include driving the optional liquid lens 37 via the ECU 22 using a sine wave to increase the depth-of-field of the physician 12, and/or using the optional circular polarizer 51 of FIG. 3 in the visualization path (VV) to increase contrast and reduce glare and reflections.

The foregoing disclosure enables construction of an indirect ophthalmoscope for digital electronic viewing of the patient's eye 140 in an office setting. The representative approach allows for optional switching between RGB and IR illumination and viewing via the digital oculars 26 of FIG. 2. One advantage of the present approach is better visualization enabled by the confocal laser diode-based scanning as set forth above. The benefit will be prevalent in the presence of corneal edema or scarring cataract, intraocular lenses (IOLs), especially multi-focal IOLs, posterior capsular opacification, and vitreous haze or hemorrhage, all of which are common sources of light scattering. These are just some of the attendant benefits of the solutions set forth above, as will be appreciated by those skilled in the art in view of the foregoing disclosure.

The detailed description and the drawings are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A visualization system for dynamically visualizing an eye, comprising:
 a laser module operable for outputting a primary laser beam along a beam axis;
 a beam splitter positioned in the beam axis and configured to direct (i) a first beam portion of the primary laser beam along the beam axis, and (ii) a second beam portion of the primary laser beam along a detection axis, wherein the detection axis is orthogonal to the beam axis;
 a microelectromechanical system (MEMS) scanner arranged on the beam axis and configured, in response to the first beam portion of the primary laser beam, to output a scanning laser toward the eye along a visualization path;
 an avalanche photodiode (APD) detector configured to receive the second beam portion of the primary laser beam; and
 a 4F correlator optical system having a spatial filter arranged along the visualization path.

2. The visualization system of claim 1, further comprising:
 an optical flat disposed between the eye and 4F correlator optical system, the optical flat having a vertical axis about which the optical flat is configured to oscillate at a calibrated frequency to thereby achieve stereo parallax when a physician visualizes the eye in real-time using the visualization system.

3. The visualization system of claim 1, wherein the laser module includes a pair of laser modules, the beam splitter includes a pair of beam splitters, the MEMS scanner includes a pair of MEMS scanners, and the APD detector includes a pair of APD detectors, such that the visualization system includes a respective one of the laser modules, the beam splitters, the MEMS scanners, and the APD detectors in each of two different viewing channels.

4. The visualization system of claim 3, further comprising:
 a lens that is selectively positionable in the visualization path between the optical flat and the eye.

5. The visualization system of claim 1, wherein the laser module includes a red, green, and blue (RGB) light emitting diode (LED) array.

6. The visualization system of claim 5, wherein the laser module includes an infrared (IR) laser diode that is selectively switchable between an RGB laser beam from the LED array and an IR laser beam from the IR laser diode.

7. The visualization system of claim 1, further comprising:
 an electronic control unit (ECU) operable for performing a confocal spot scan of the eye using the laser module, the MEMS scanner, the 4F correlator optical system, and the APD detector.

8. The visualization system of claim 7, further comprising:
 a liquid lens operable for increasing a depth-of-field of a physician when using the visualization system, wherein the liquid lens is sine wave-driven by the ECU.

9. The visualization system of claim 1, further comprising:
 organic light-emitting diode (OLED) digital oculars.

10. The visualization system of claim 1, further comprising:
 a headset configured to be worn by a physician when dynamically visualizing the eye, wherein the visualization system is mounted to the headset.

11. The visualization system of claim 1, wherein the 4F correlator optical system includes a Fourier plane, and wherein the spatial filter includes at least one pinhole located in the Fourier plane.

12. The visualization system of claim 1, further comprising:
 a circular polarizer situated along the visualization path.

13. A visualization system for dynamically visualizing an eye, comprising:
 a laser module operable for outputting a primary laser beam along a beam axis, the laser module including a red, green, and blue (RGB) light emitting diode (LED) array and an infrared (IR) laser diode, and wherein the laser module is selectively switchable between the RGB LED array and the IR laser diode;
 a beam splitter positioned in the beam axis, the beam splitter being configured to direct (i) a first beam portion of the primary laser beam along the beam axis, and (ii) a second beam portion of the primary laser beam along a detection axis ($A_{360}$), wherein the detection axis is arranged orthogonal to the beam axis;
 a microelectromechanical system (MEMS) scanner arranged on the beam axis and configured, in response to the first beam portion of the primary laser beam, to output a scanning laser toward the eye along a visualization path;
 an avalanche photodiode (APD) detector configured to receive the second beam portion of the primary laser beam;
 a 4F correlator optical system having a Fourier plane and a spatial filter arranged along the visualization path, the spatial filter including at least one pinhole located in the Fourier plane;
 digital oculars;
 an optical flat disposed between the eye and 4F correlator optical system, the optical flat having a vertical axis about which the optical flat is configured to oscillate at a calibrated frequency to thereby achieve stereo parallax when a physician visualizes the eye using the visualization system; and
 an electronic control unit (ECU) operable for performing a confocal spot scan of the eye using the laser module, the MEMS scanner, the 4F correlator optical system, and the APD detector.

14. The visualization system of claim 12, wherein the optical flat includes one or more piezo-actuators.

15. The visualization system of claim 12, further comprising:
a liquid lens operable for increasing a depth-of-field of a physician when visualizing the eye, wherein the liquid lens is sine wave-driven by the ECU.

16. The visualization system of claim 12, further comprising:
a circular polarizer situated along the visualization path.

17. The visualization system of claim 12, further comprising:
a headset configured to be worn by a physician when dynamically visualizing the eye, wherein the visualization system is mounted to the headset.

18. A method for dynamically visualizing an eye, comprising:
outputting a primary laser beam along a beam axis using a laser module, including outputting a red, green, and blue (RGB) laser beam and an infrared (IR) laser beam;
directing, via a beam splitter, (i) a first beam portion of the primary laser beam along the beam axis, and (ii) a second beam portion of the primary laser beam along a detection axis;
in response to the first beam portion of the primary laser beam, outputting a scanning laser toward the eye along a visualization path via a microelectromechanical system (MEMS) scanner;
detecting the second beam portion of the primary laser beam via an avalanche photodiode (APD) detector;
directing the second beam portion of the primary laser beam along the detection axis and through a 4F correlator optical system having a spatial filter arranged in the visualization path; and
performing a confocal spot scan of the eye via an electronic control unit (ECU) using the laser module, the MEMS scanner, the 4F correlator optical system, and the APD detector.

19. The method of claim 18, further comprising:
driving a liquid lens via the ECU using a sine wave to thereby increase a depth-of-field of a physician when dynamically visualizing the eye.

20. The method of claim 18, further comprising:
oscillating an optical flat about a vertical axis of the optical flat at a calibrated frequency to thereby achieve stereo parallax when a physician dynamically visualizes the eye.

* * * * *